(12) United States Patent
Koelle et al.

(10) Patent No.: US 6,351,104 B1
(45) Date of Patent: Feb. 26, 2002

(54) MULTI-VOLTAGE VEHICLE ELECTRIC SYSTEM

(75) Inventors: Gerhard Koelle, Wiernsheim; Albert Geiger, Eberdingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,088

(22) PCT Filed: Jul. 28, 1999

(86) PCT No.: PCT/DE99/02315

§ 371 Date: Apr. 24, 2000

§ 102(e) Date: Apr. 24, 2000

(87) PCT Pub. No.: WO00/13303

PCT Pub. Date: Mar. 9, 2000

(30) Foreign Application Priority Data

Aug. 27, 1998 (DE) .......................... 198 38 973

(51) Int. Cl.⁷ .............................. H02P 7/85; H02P 7/06; H02P 11/06; H02H 4/38; H02H 9/08
(52) U.S. Cl. .............................. 322/22; 322/28; 322/77; 322/89
(58) Field of Search .............................. 322/90, 28, 33, 322/29, 46, 94; 320/17

(56) References Cited

U.S. PATENT DOCUMENTS

| | | | |
|---|---|---|---|
| 4,686,442 A | | 8/1987 | Radomski ................ 320/17 |
| 4,963,813 A | * | 10/1990 | Bolle ..................... 320/17 |
| 5,166,538 A | * | 11/1992 | Norton .................. 307/10.1 |
| 5,512,811 A | * | 4/1996 | Latos et al. ............... 322/10 |
| 5,585,708 A | * | 12/1996 | Richardson et al. ......... 318/800 |
| 5,663,631 A | * | 9/1997 | Kajiura et al. ............. 322/29 |
| 5,719,487 A | * | 2/1998 | Sato et al. ................ 322/28 |
| 5,942,818 A | * | 8/1999 | Satoh et al. .............. 310/46 |
| 6,049,195 A | * | 4/2000 | Geis et al. ................ 322/46 |
| 6,049,198 A | * | 4/2000 | Schenk .................... 322/90 |

FOREIGN PATENT DOCUMENTS

| | | |
|---|---|---|
| DE | 195 19 298 | 5/1995 |
| EP | 0 372 819 | 6/1990 |

* cited by examiner

Primary Examiner—Burton S. Mullins
Assistant Examiner—Julio C. Gonzalez
(74) Attorney, Agent, or Firm—Michael J. Striker

(57) ABSTRACT

A multi-voltage electrical system for a vehicle is described, which includes a generator and a voltage regulator; the voltage regulator regulates the output voltage of the generator to predeterminable values by varying the exciter current. Connected downstream of the generator are two rectifier arrangements, which lead to a terminal (B1) and a terminal (B2), respectively. At least the rectifier arrangement leading to the terminal having the lower voltage is designed as a controllable rectifier and is triggered by the voltage regulator in such a way that the desired voltage (UB1+) occurs. The other rectifier arrangement leads to the terminal (B2+), at which a higher voltage occurs, by suitable regulation of the exciter current. The controllable rectifier arrangement preferably includes six MOS field effect transistors.

12 Claims, 3 Drawing Sheets

MULTI-VOLTAGE VEHICLE ELECTRIC SYSTEM

BACKGROUND OF THE INVENTION

The invention relates to a multi-voltage electrical system for a vehicle.

It is known that in a vehicle electrical system, in which the supply voltage needed for the electrical consumers is generated by means of a generator, the generator should furnish more than one supply voltage, so as to assure reliable component-specific electrical supply. A vehicle electrical system in which a plurality of different supply voltages are furnished is known from Published, Nonexamined German Patent Application DE-OS 195 19 298. In one such known vehicle electrical system, the electrical energy is generated with the aid of a three-phase generator. The resultant voltage is converted into two different direct voltages with the aid of two rectifier bridges, which can be connected to different points of the phase winding of the generator. In some known versions, thyristors are used as the rectifiers. In addition to the rectification, field effect transistors are employed, with the aid of which a load current limitation is made. The field effect transistors are to that end employed in electrical terms downstream of the rectifier bridges. They are connected to the various voltage pickups, at which the different electrical system voltages can be picked up.

SUMMARY OF THE INVENTION

The multi-voltage electrical system according to the invention for a vehicle, has the advantage that from the phase voltages of the generator, at least two different direct voltages can be generated, and at the same time the voltage levels are prevented from adversely affecting one another.

These advantages are attained in that two rectifier arrangements are connected to the phase windings of the generator, and one of the rectifier arrangements is constructed with the aid of controllable rectifier elements, in particular using six MOS field effect transistors, of which two at a time are connected in series with one another and are each located between one phase winding and the common terminal B+. The other rectifier arrangement, at which the higher voltage can be picked up, corresponds to the conventional arrangement of plus and minus diodes between the phase windings of the generator and the terminal B2+.

Further advantages of the invention are attained by other provisions. For instance, it is advantageous to perform the generator regulation in such a way that a voltage of 12 or 14 V is established at one voltage pickup, while 36 or 42 V is available at the other voltage pickup. Advantageously, the rectifier elements of the rectifier arrangement that is located between the generator and B+ are also embodied as MOS field effect transistors. The triggering of the field effect transistors is advantageously accomplished by the voltage regulator or by a control and regulating unit, which is also responsible for the regulation of the exciter current.

The invention can especially advantageously be employed in conjunction with an electrical machine that can function both as a motor (starter) and as a generator. In that case, depending on the operating state, the MOS field effect transistors can function as controllable rectifiers or as controllable inverters; in the mode of operation as a motor, the electrical machine can be operated as an asynchronous or a synchronous motor and can be supplied by a battery, via the field effect transistors operating as controllable inverters.

In a further advantageous feature, additional rectifier arrangements are employed, which furnish still another direct voltage. The rectifier elements connected to the terminal B1+ can also be constructed in such a way that one diode per phase is used; the anode is connected to the applicable phase winding, and the cathodes are jointly connected to a field effect transistor connected in series with them and acting as a controllable actuator. If one field effect transistor per phase winding is used, then a wiring can be provided such that the anode of the parasitic diode is connected to the applicable phase winding, and the cathodes of the parasitic diode are connected jointly to a field effect transistor connected in series with them, which again functions as a controllable actuator.

In the regulation of the generator, the power switches can advantageously be triggered in such a way that the predetermined voltage values at the two terminals B1+ and B2+ can each be established independently of the respective network load and the generator rpm.

BRIEF DESCRIPTION OF THE DRAWINGS

Two exemplary embodiments of the invention are shown in the drawing will be described in further detail below. In addition, FIG. 3 also shows current-voltage courses when a three-phase generator is supplied each via separate controllable rectifier in two networks having the rated voltages of 12 V and 36 V.

DESCRIPTION OF THE PREFERRED EMBODIMENTS

Figure 1:
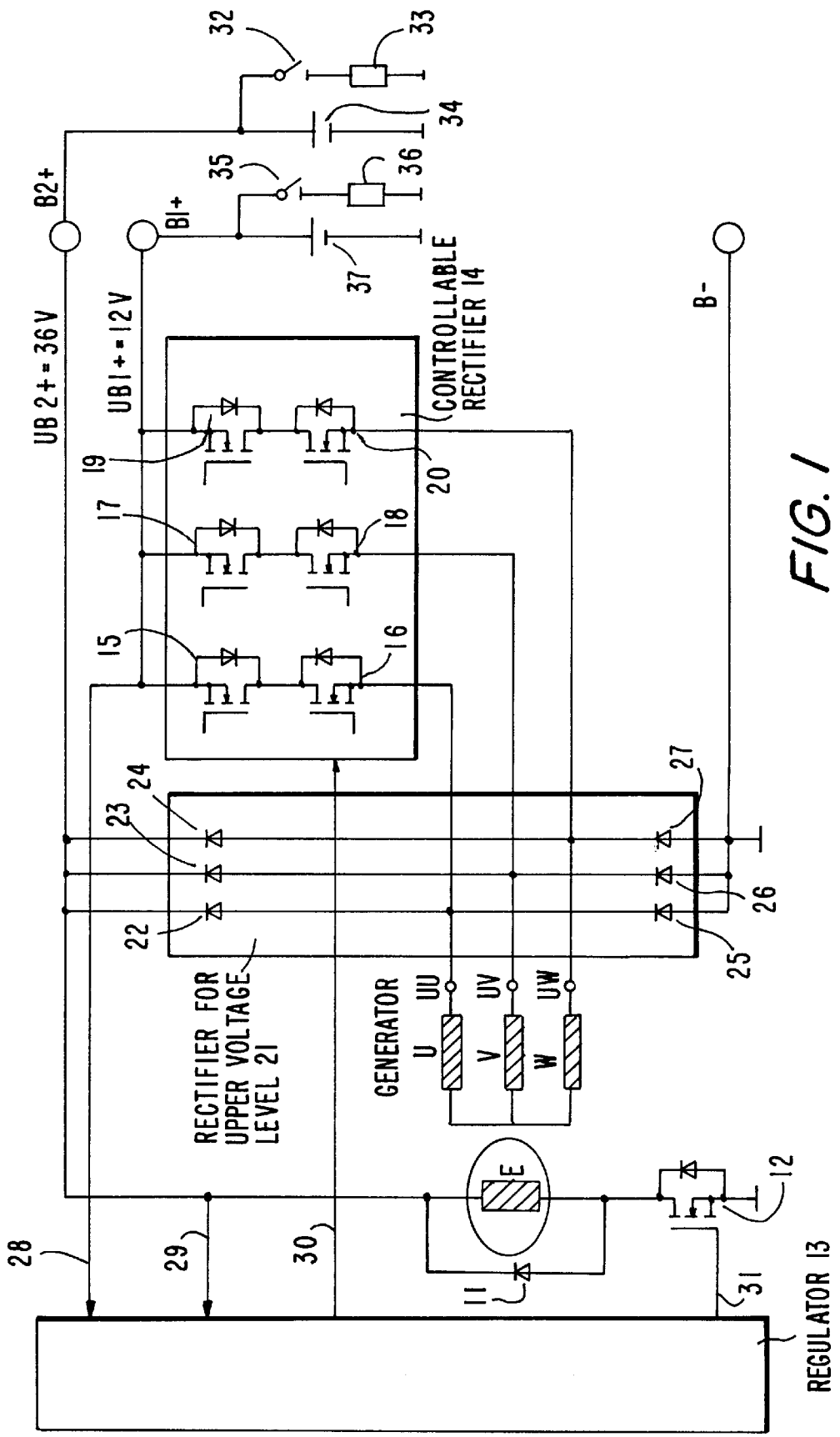

In FIG. 1, a first exemplary embodiment of the invention is shown, in which the generator that furnishes the voltages required for supplying the electrical system is assigned reference numeral 10. The generator 10 is for instance an externally excited synchronous generator with two voltage outputs B1+ and B2+, at which the voltages UB1+ and UB2+ occur. All that is shown of the generator itself is its phase windings U, V and W are shown, wired in delta fashion. The voltages UU, UV and UW occur at the phase windings. The exciter winding of the generator 10 is marked E. A free-wheel diode 11 is connected parallel to the exciter winding E. The exciter winding E is located between the terminal B1+ and a regulating transistor 12, for instance a field effect transistor, that on the side remote from the exciter winding is connected to ground. The regulating transistor 12 is triggered by the voltage regulator 13. The voltage regulator 13, which by operations of triggering the regulating transistor 12 varies the current through the exciter winding E and thus regulates the output voltage of the generator 10, is additionally supplied with the voltages UP1+ and UP2+, which it can take into account as actual voltages in the voltage regulation.

The phase windings U, V and W of the generator 10 are adjoined by two rectifier arrangements, which in turn are still part of the generator 10. The first rectifier arrangement 14 is designed as a controllable rectifier and includes six controllable rectifier elements, for instance the field effect transistors 15–20. The interconnection of the field effect transistors is such that two at a time are in series with one another, and this series circuit is located between a phase winding of the generator and the terminal B2+.

The second rectifier arrangement is marked 21; it is embodied in a known manner as a plus and minus bridge and includes six diodes 22–27, whose connecting points are each connected to one phase winding of the generator. The anodes of the diodes of the minus bridge are connected to ground and to the generator terminal B–.

The cathodes of the plus bridge are connected to the terminal B2+, at which the higher voltage UB2+ is located.

The output voltage of the generator, or the voltages occurring in the phase windings U, V, W of the generator 10, are rectified with the aid of the two rectifier arrangements 14 and 21. Regulating the height of the output voltages of the generator is done by varying the exciter current IE, which is regulated by the voltage regulator 13. With the circuit arrangement shown in FIG. 1, the generator is regulated such that the output voltage UB2+, which for instance is 36 V, appears at the output B2+. This voltage is available for consumers that have a high power consumption and that are to be supplied at the thus-designated upper voltage level. By suitable triggering of the controllable rectifier 14, for instance by triggering the field effect transistors by the voltage regulator 13, the voltage at the terminal B1+ can be regulated in such a way that the voltage UB1=12 V (rated voltage). Both the regulation of the generator to UB2+ and the triggering of the controllable rectifiers 14 are performed by the voltage regulator as a function of the actual voltage value supplied to it via suitable connections 28, 29. The triggering operations by the voltage regulator 13 are effected via the connections 30 and 31.

While the consumers 33 that are to be supplied with the higher voltage can be connected via switches 32 to the terminal B2+, to which a charge reservoir, such as a battery 34 or a capacitor, is optionally also connected, electrical system consumers 36 that require 12 V can be connected to the terminal B1+ via the switch 35. The electrical system battery 37 is conventionally connected to the terminal B1+.

The two voltages, that is, 12 V (lower voltage level) and 36 V (upper voltage level), correspond to rated voltages; the associated charge voltages are accordingly 14 V and 42 V, respectively. With the higher voltage, the electric water pump, the electric steering, an electrical valve drive, electrical disk heaters, or the like are for instance operated. The 12 V consumers are the familiar electrical consumers in a vehicle electrical system.

In the exemplary embodiment of the invention shown in FIG. 1, the higher output voltage UB2+ of the generator is regulated by regulating the exciter current or the exciter power. Conversely, the so-called lower voltage level at the terminal UB1+ is supplied via the controllable rectifier arrangement 14, for instance by clocking in synchronously with the phase current IU, IV or IW, at the time of the conducting period length of the upper rectifier 21. As a result, the upper diode is blocked and the phase current flows into the lower circuit. When the controllable rectifier is switched off, the phase current commutates back to the upper diode. The regulation performed by the voltage regulator thus regulates the phase relationship and the ON time of the controllable rectifier 14 to the 12 V of the lower voltage level. By the choice of a suitable phase relationship of the controllable rectifier 14 or by correspondingly triggering the MOS field effect transistors 15–20 of the controllable rectifier 14, the waviness of the upper voltage is favorably affected, or in other words is reduced.

The current diverted by the described provisions in the lower voltage level does not cause any reduction in the upper (higher) voltage UB2+, as long as the maximum power of the generator 10 is not exceeded, since this voltage continues to be regulated via the exciter power. Thus the regulation of the upper voltage, at least within certain limits, is performed by regulating the exciter power independently of power withdrawals at the terminal B2+.

To prevent a voltage dip at the upper voltage level if the maximum power of the generator is exceeded, the maximum forced tripping phase angle of the controllable rectifier 14 is limited as a function of the control deviation of the upper voltage level.

The circuit shown in the exemplary embodiment of FIG. 1, in its lower bridge branch, uses common rectifier diodes 25, 26 and 27. The upper branch is equipped for the resting voltage with diodes 22, 23 and 24. For the lower voltage level, conversely, two MOS field effect transistors each, connected in series, are provided. This prevents unregulated compensation currents from being able to form between the two voltage levels. Instead of the MOS field effect transistors 15–20, other controllable rectifier elements could be employed instead. Instead of the diodes 22–27, for instance, Zener diodes or likewise controllable rectifier elements could be used. In a further embodiment, the externally excited synchronous generator could be replaced by an arbitrary electrical machine. In particular, the invention can also be expanded for an electrical machine that can be operated as a motor and/or generator; in that case, the embodiment described below in conjunction with FIG. 2 is preferable.

Figure 2:
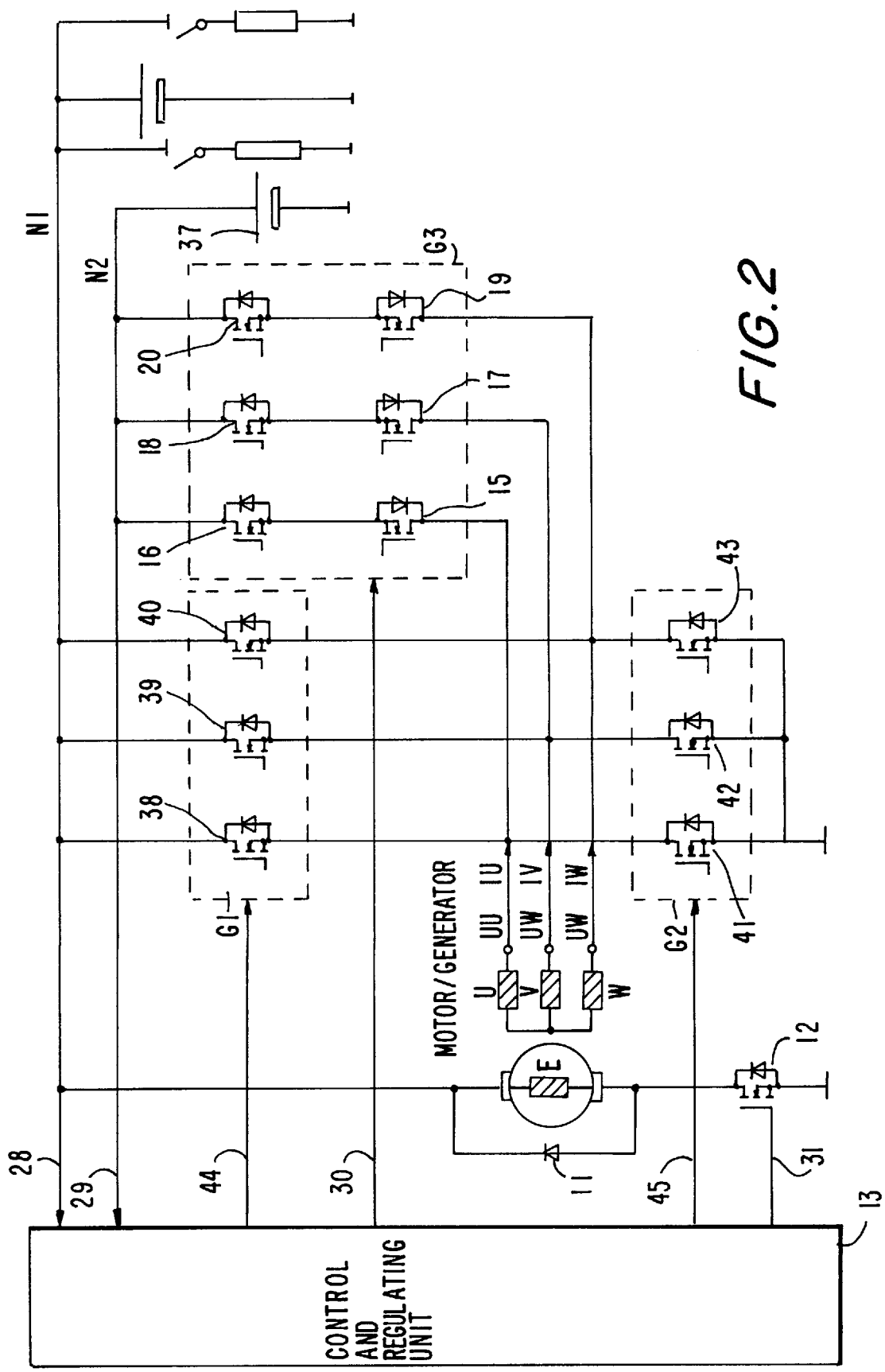

In the exemplary embodiment of FIG. 2, in which identical components to those of the exemplary embodiment of FIG. 1 are provided with the same reference numerals, the voltage is generated with the aid of an electrical machine 10*a*, which can be operated as a generator and can also be operated additionally as a motor. As in the exemplary embodiment of FIG. 1, controllable rectifiers 15–20 are present, which in the exemplary embodiment of FIG. 2 are designated as a group G3. The diodes 22–27 are replaced by field effect transistors 38–43; the field effect transistors 38, 39 and 40 are designated as group G1, and the field effect transistors 41, 42 and 43 are designated as group G2. The two associated voltage networks are indicated at N1 and N2; the network N1 corresponds to the terminal B2+, and the network N2 corresponds to the terminal B1+. The field effect transistors 38–40 are triggered by the voltage regulator 13 via the connection 44, and the field effect transistors 41–43 are triggered via the connection 45. The function of the circuit arrangement of FIG. 2 will be described in further detail below.

In the predetermined application, the network N1 forms a 36 V (rated voltage) or 42 V (charge voltage) voltage network for consumers that have a higher power consumption, and the network N2 forms a 12 V (rated voltage) or 14 V (charge voltage) voltage network for consumers with a lower power consumption. Still other voltage classes are conceivable; in principle, the voltages of networks N1 and N2 could also be the same. An expansion to n networks is also possible.

Since the electrical machine 10*a* can be operated as both a motor and a generator, a distinction must be made between the mode of operation as a motor and the mode of operation as a generator. The mode of operation as a motor is employed after the internal combustion engine has turned over, to bring the engine to the desired starting rpm. The mode of operation as a motor is accordingly equivalent to the starter operating mode. In the mode of operation as a motor, the electrical machine is controlled as a synchronous/asynchronous motor. The controllable rectifiers of groups G1 and G2, in the mode of operation as a motor, form the controllable inverters that supply the electrical machine with energy from the network N1. The battery 34 belongs to the network N1.

In the mode of operation as a generator, once the engine of the vehicle has reached its starting rpm, two independent battery networks N1 and N2 are charged by the same electrical machine 10*a* in the mode of operation as a generator. To that end, the controlled rectifier groups G1 and G2 in the mode of operation as a generator form the controllable rectifiers for charging the network N1. In the mode of operation as a generator, groups G1 and G3 form the controllable rectifiers for charging the network N2.

The group G3 of controllable rectifier elements can be constructed either as shown in FIG. 2, each including one field effect transistor per phase, with the anode of the parasitic diode connected to the applicable phase and the cathodes of the parasitic diode connected jointly with a field effect transistor, connected in series with them, as a controllable actuator, or there can be diode per phase, with the anode connected to the applicable phase and the cathodes connected jointly to a field effect transistor, connected in series with them, as a controllable actuator.

Figure 3:
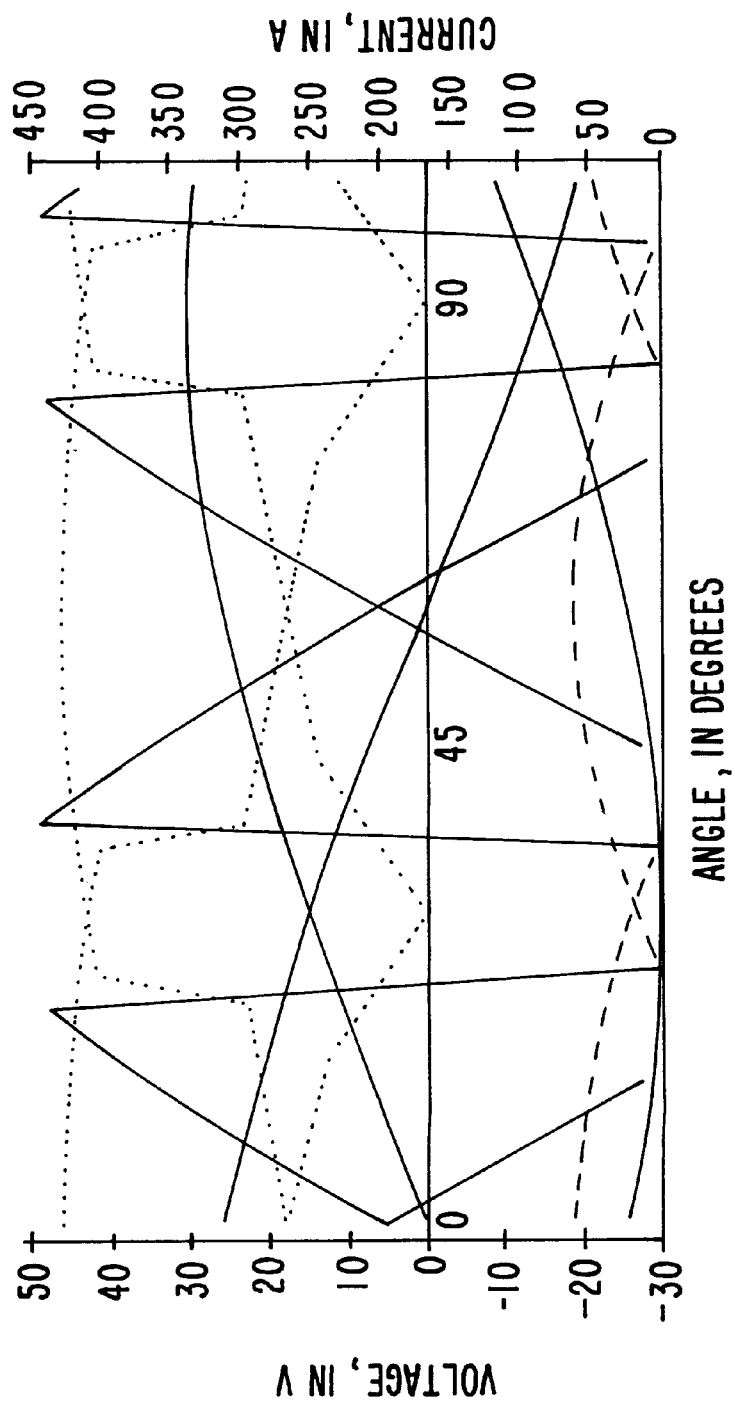

In the regulation process required in the mode of operation as a generator, the courses of the phase voltages, conductor voltages and conductor currents as shown in FIG. 3 are obtained for the exemplary embodiment shown in FIG. 2. Individually, FIG. 3 shows current-voltage courses when a three-phase generator is supplied with the phase voltages UU, UV, UW, each via a separate controllable rectifier in two networks having the rated voltages of 12 V and 36 V. FIG. 3 shows the phase voltages UU, UV and UW, the conductor voltages UU-V, UV-W and UW-U, and the conductor currents I12UV, I12VW, and I12WU in the 12 V network and the conductor currents I36UV, I36VW, and I36WU in the 36 V network, plotted over the phase winding. The individual designations can be seen in the drawing.

The control and regulating unit is intended to take on the following tasks: The power switches of the actuators of the groups G1, G2 and G3 of the controllable rectifiers and of the actuator 12, which corresponds to the regulating transistor for the exciter control of the generator, should be switched phase-synchronously in such a way that the pre-determined voltage values for network N1 and N2 are established, regardless of the net load at the time and the generator rpm. For the selected circuit arrangement, the network N1 furnishes the high voltage level, and the network N2 furnishes the low voltage level. For the supply of the individual networks, the following then applies:

Supply, network 1:

While the applicable conductor voltage UU-V, UV-W, UW-U is less than the present voltage of network 1 but higher than that of network N2, a supply into the network N2 is made as needed via groups G2 and G3.

Supply, network 1:

If the applicable conductor voltage exceeds the present voltage level in the network N1, a supply into network N1 is effected. The semiconductor switches (such as MOS field effect transistors) of groups G1 and G2 are turned on, given a current flow in the corresponding conductor, to reduce the power loss. The semiconductor switches of group G3 for supply into the network N2 are blocked in this case, and the current that flows into the network N2 is thus 0.

The excitation of the electrical machine operating as a generator is established in accordance with the energy requirement into the network N1 by the control and regulating unit, that is, the voltage regulator 13 in conjunction with the regulating transistor 12. To that end, the voltage regulator 13 switches the regulating transistor 12 on and off in clocked fashion, taking into account the established set-point voltage and the actual voltage delivered, which in the exemplary embodiment of FIG. 2 reaches the voltage regulator 13 via the connection 28.

If there is inadequate supply to the network N1, if despite maximum excitation of the generator not enough electrical energy to supply the network N can be furnished by this generator, then by clocked triggering of the network N2, the energy stored in this process in the inductance of the stator winding (U, V, W) can be fed into the network N1 after group G3 is switched off. In practice, in the motor vehicle, this means that if the engine rpm is low, as in idling, when the generator voltage is insufficient to supply the voltage network N1, the free-wheel energy that occurs by clocked triggering of the network N2 can be fed into the network N1.

What is claimed is:

1. A multi-voltage electrical system for a vehicle, having a generator and a voltage regulator that regulates the output voltage of the generator to predeterminable values by varying the current flowing through the exciter winding, having at least two rectifier arrangements downstream of the generator, in which the first rectifier arrangement leads to a first terminal (B1+), at which a first direct voltage (UB1+) occurs, and the second rectifier arrangement leads to a second terminal (B2+), at which a second, higher direct voltage (UB2+) is located, the first direct voltage (UB1+) and the second direct voltage (UB2+) being regulatable independently from a rotary speed, and said first rectifier arrangement is constructed as a controllable rectifier with at least six controllable rectifier elements, and two at a time of these are in series with one another and are each connected between one phase winding and the terminal (B1+), and that the voltage regulator (13) triggers the regulating transistor (12) in such a way that an exciter current (IE) flows, which causes a higher voltage (of 36 or 42 V) to occur at the terminal (B2+), and that the regulator (13) simultaneously triggers the controllable rectifiers (14) in such a way that a lower voltage (of 12 V or 14 V) occurs at the terminal (B1+) the first direct voltage (UB1+) and the second direct voltage (UB2+) being regulatable independently from a rotary speed.

2. The multi-voltage electrical system of claim 1, characterized in that the controllable rectifier elements are MOS field effect transistors, which are each triggered by the voltage regulator (13).

3. The multi-voltage electrical system of claim 1, characterized in that the voltage regulator (13) triggers the regulating transistor (12) in such a way that an exciter current (IE) flows, which causes a voltage of 36 or 42 V to occur at the terminal (B2+), and that the regulator (13) simultaneously triggers the controllable rectifiers (14) in such a way that a voltage of 12 V or 14 V occurs at the terminal (B1+).

4. The multi-voltage electrical system of claim 1, characterized in that the rectifier elements of group (G3) each have one diode per phase winding of the generator, whose anode is connected to the respective phase winding and whose cathodes jointly cooperate with a field effect transistor, as a controllable actuator, connected in series with them.

5. The multi-voltage electrical system of claim 1, characterized in that the generator (10) is an electrical machine (10a), which can be operated as a motor or as a generator, and the motor operating mode is used to start an internal combustion engine and the generator operating mode occurs after starting of the engine, and both the motor operating mode and the generator operating mode are performed using controllable rectifier elements.

6. The multi-voltage electrical system of claim 5, characterized in that the rectifier elements (G3) each have one field effect transistor per phase winding; that the anode of the parasitic diode of the field effect transistor is connected to the respective phase winding, and the cathodes of the parasitic diode cooperate jointly with a field effect transistor, as a controllable actuator, connected in series with them.

7. The multi-voltage electrical system of claim 1, characterized in that the supply to the voltage network (N1) and to the voltage network (N2) is adjustable independently of one another.

8. A multi-voltage electrical system for a vehicle, having a generator and a voltage regulator that regulates the output voltage of the generator to predeterminable values by varying the current flowing through the exciter winding, having at least two rectifier arrangements downstream of the generator, in which the first rectifier arrangement leads to a first terminal (B1+), at which a first direct voltage (UB1+) occurs, and the second rectifier arrangement leads to a second terminal (B2+), at which a second, higher direct voltage (UB2+) is located, characterized in that the first rectifier arrangement is constructed as a controllable rectifier with at least six controllable rectifier elements, and two at a time of these are in series with one another and are each connected between one phase winding and the terminal (B1+), a battery (37) can be connected to the terminal (B1+), and at least one 12 V electrical system consumer (36) can be incorporated via at one switch (35), and that at the terminal (B2+) via at least one switch (32), consumers (33) that have a power consumption can be incorporated, and optionally a further battery (34) can be connected to the terminal (B2+).

9. A multi-voltage electrical system for a vehicle, having a generator and a voltage regulator that regulates the output voltage of the generator to predeterminable values by varying the current flowing through the exciter winding, having at least two rectifier arrangements downstream of the generator, in which the first rectifier arrangement leads to a first terminal (B1+), at which a first direct voltage (UB1+) occurs, and the second rectifier arrangement leads to a second terminal (B2+), at which a second, higher direct voltage (UB2+) is located, characterized in that the first rectifier arrangement is constructed as a controllable rectifier with at least six controllable rectifier elements, and two at a time of these are in series with one another and are each connected between one phase winding and the terminal (B1+), the generator (10) is an electrical machine (10a), which can be operated as a motor or as a generator, and the motor operating mode is used to start an internal combustion engine and the generator operating mode occurs after starting of the engine, and both the motor operating mode and the generator operating mode are performed using controllable rectifier elements, and in the motor operating mode, the electrical machine (10a) operates as a synchronous or an asynchronous motor, and the group (G1) and the group (G2) of controllable rectifiers act as controllable inverters and supply the electrical machine with voltage from the battery (34).

10. A multi-voltage electrical system for a vehicle, having a generator and a voltage regulator that regulates the output voltage of the generator to predeterminable values by varying the current flowing through the exciter winding, having at least two rectifier arrangements downstream of the generator, in which the first rectifier arrangement leads to a first terminal (B1+), at which a first direct voltage (UB1+) occurs, and the second rectifier arrangement leads to a second terminal (B2+), at which a second, higher direct voltage (UB2+) is located, characterized in that the first rectifier arrangement is constructed as a controllable rectifier with at least six controllable rectifier elements, and two at a time of these are in series with one another and are each connected between one phase winding and the terminal (B1+), the generator (10) is an electrical machine (10a), which can be operated as a motor or as a generator, and the motor operating mode is used to start an internal combustion engine and the generator operating mode occurs after starting of the engine, and both the motor operating mode and the generator operating mode are performed using controllable rectifier elements, and in the mode of operation as a generator, the controllable rectifiers of groups (G1 and G2) are used for charging the network (N1), and the groups (G1 and G3) are used for charging the network (N2).

11. A multi-voltage electrical system for a vehicle, having a generator and a voltage regulator that regulates the output voltage of the generator to predeterminable values by varying the current flowing through the exciter winding, having at least two rectifier arrangements downstream of the generator, in which the first rectifier arrangement leads to a first terminal (B1+), at which a first direct voltage (UB1+) occurs, and the second rectifier arrangement leads to a second terminal (B2+), at which a second, higher direct voltage (UB2+) is located, characterized in that the first rectifier arrangement is constructed as a controllable rectifier with at least six controllable rectifier elements, and two at a time of these are in series with one another and are each connected between one phase winding and the terminal (B1+), and the regulator switches the controllable rectifiers of the group (G1, G2, G3) and the regulating transistor (12) for the excitation control of the generator in phase synchronism in such a way that the predetermined voltage values are established at the network (N1) and the network (N2) regardless of the applicable network load and the generator rpm.

12. A multi-voltage electrical system for a vehicle, having a generator and a voltage regulator that regulates the output voltage of the generator to predeterminable values by varying the current flowing through the exciter winding, having at least two rectifier arrangements downstream of the generator, in which the first rectifier arrangement leads to a first terminal (B1+), at which a first direct voltage (UB1+) occurs, and the second rectifier arrangement leads to a second terminal (B2+), at which a second, higher direct voltage (UB2+) is located, characterized in that the first rectifier arrangement is constructed as a controllable rectifier with at least six controllable rectifier elements, and two at a time of these are in series with one another and are each connected between one phase winding and the terminal (B1+), if the voltage network (1) is inadequately supplied despite maximum excitation of the generator, a clocked triggering of the rectifier elements acting on the network (N2) is done, and the energy stored as a result in the starter winding of the generator is fed into the network (N1).

* * * * *